(12) United States Patent
Arnold

(10) Patent No.: US 10,718,262 B2
(45) Date of Patent: Jul. 21, 2020

(54) VARIABLE STROKE CONSTANT COMPRESSION RATIO ENGINE

(71) Applicant: Steven Don Arnold, Washington, UT (US)

(72) Inventor: Steven Don Arnold, Washington, UT (US)

(*) Notice: Subject to any disclaimer, the term of this patent is extended or adjusted under 35 U.S.C. 154(b) by 93 days.

(21) Appl. No.: 15/913,166

(22) Filed: Mar. 6, 2018

(65) Prior Publication Data

US 2018/0252157 A1  Sep. 6, 2018

Related U.S. Application Data

(60) Provisional application No. 62/467,662, filed on Mar. 6, 2017.

(51) Int. Cl.
| | |
|---|---|
| F02B 75/04 | (2006.01) |
| F16H 23/02 | (2006.01) |
| F01B 3/00 | (2006.01) |
| F02B 75/26 | (2006.01) |
| F16H 23/04 | (2006.01) |

(52) U.S. Cl.
CPC .......... F02B 75/048 (2013.01); F01B 3/0017 (2013.01); F01B 3/0023 (2013.01); F16H 23/02 (2013.01); F01B 2003/0097 (2013.01); F02B 75/26 (2013.01); F16H 23/04 (2013.01)

(58) Field of Classification Search
CPC ... Y10T 74/18336; F16H 23/02; F16H 23/94; F01B 3/0017; F01B 3/0023; F01B 3/102; F01B 2003/0097; F02B 75/048; F02B 75/26; F02B 75/32; F02D 15/02; F02F 7/006

USPC .................................. 74/60; 123/56.4, 48 B
See application file for complete search history.

(56) References Cited

U.S. PATENT DOCUMENTS

| | | | | |
|---|---|---|---|---|
| 1,335,310 A | * | 3/1920 | Yeakley | F16H 23/08 123/56.4 |
| 1,666,539 A | * | 4/1928 | Michell | F16H 23/02 74/56 |
| 1,819,715 A | * | 8/1931 | Le Bret | F16H 23/02 74/60 |

(Continued)

*Primary Examiner* — Jacob M Amick
*Assistant Examiner* — Michael A Kessler
(74) *Attorney, Agent, or Firm* — Felix L. Fischer

(57) ABSTRACT

A continuously variable displacement engine has a plurality of pistons received in a cylinder block and connected to a nutator. A crankshaft with an axis of rotation is carried in a crankcase and incorporates an upper journal with a first angle relative to the axis and a lower journal with a second angle with respect to the axis. A first slider ball is engaged on the upper journal and a second slider ball engaged on the lower journal. A carrier assembly captures the first and second slider balls and incorporates an actuating cylinder. An actuation piston assembly is translatably carried in the actuating cylinder and connected to the crankshaft intermediate the upper journal and lower journal. The actuating piston is controllably translated between a first high eccentricity position and second low eccentricity position. An anti-rotational assembly connects the nutator to a piston case. A balance mechanism is adapted to change the amount of counterbalance for the nutator and the axial location of the counterbalance consistent with eccentricity of the nutator.

17 Claims, 15 Drawing Sheets

(56) References Cited

U.S. PATENT DOCUMENTS

| | | | | |
|---|---|---|---|---|
| 1,968,470 A * | 7/1934 | Szombathy | ............ | F16H 23/02 123/56.4 |
| 2,532,254 A * | 11/1950 | Bouchard | ............... | F16H 23/08 74/60 |
| 2,539,880 A * | 1/1951 | Wildhaber | ............ | F01B 3/0023 74/60 |
| 3,257,855 A * | 6/1966 | Dangauthier | ........... | F16H 23/08 74/60 |
| 3,964,323 A * | 6/1976 | Seibert | ...................... | F01B 3/02 74/60 |
| 4,003,352 A * | 1/1977 | Rogojew | ................. | F02B 75/26 123/56.4 |
| 4,077,269 A * | 3/1978 | Hodgkinson | ......... | F01B 3/0088 417/269 |
| 5,113,809 A * | 5/1992 | Ellenburg | ............. | F01B 3/0002 123/48 R |
| 2004/0118365 A1* | 6/2004 | Brueckmueller | ......... | F01B 3/02 123/56.3 |
| 2005/0155488 A1* | 7/2005 | Shulenberger | ........ | F01B 3/0002 92/71 |
| 2010/0300410 A1* | 12/2010 | Arnold | .................. | F01B 3/0002 123/48 B |
| 2015/0226209 A1* | 8/2015 | Conde | ................... | F04B 49/125 417/53 |

\* cited by examiner

VARIABLE STROKE CONSTANT COMPRESSION RATIO ENGINE

REFERENCES TO RELATED APPLICATIONS

This application claims priority of U.S. provisional application Ser. No. 62/467,662 having a filing date of Mar. 6, 2017 entitled IMPROVED VARIABLE STROKE CONSTANT COMPRESSION RATIO ENGINE, the disclosure of which is incorporated herein by references.

GOVERNMENT LICENSE RIGHTS TO CONTRACTOR-OWNED INVENTIONS MADE UNDER FEDERALLY SPONSORED RESEARCH AND DEVELOPMENT

This invention was made with government support under SBIR/STTR grant DE-SC0015948 issued on Jun. 21, 2016 by the United States Department of Energy. The government has certain rights in the invention.

FIELD

The disclosed implementations relate generally to the field of internal combustion engines and more particularly to a multicylinder internal combustion engine having a nutator connected to the pistons and positionable on a dual angled crank for variation of the stroke while maintaining constant compression ratio to produce a Continuously Variable Displacement (CVD) engine.

RELATED ART

The implementations disclosed herein are improvements to the variable stroke constant compression ratio engine disclosed in U.S. Pat. No. 8,511,265 issued on Aug. 20, 2013 having a common inventor with the present application.

SUMMARY

The implementations disclosed herein provide a continuously variable displacement engine having a plurality of pistons received in a cylinder block and connected to a nutator. A crankshaft with an axis of rotation is carried in a crankcase and incorporates an upper journal with a first angle relative to the axis and a lower journal with a second angle with respect to the axis. A first slider ball is engaged on the upper journal and a second slider ball engaged on the lower journal. A carrier assembly captures the first and second slider balls and incorporates an actuating cylinder. An actuation piston assembly is translatably carried in the actuating cylinder and connected to the crankshaft intermediate the upper journal and lower journal. The actuating piston is controllably translated between a first high eccentricity position and second low eccentricity position. An anti-rotational assembly connects the nutator to a piston case. A balance mechanism is adapted to change the amount of counterbalance for the nutator and the axial location of the counterbalance consistent with eccentricity of the nutator.

BRIEF DESCRIPTION OF THE DRAWINGS

These and other features and advantages of the present invention will be better understood by reference to the following detailed description when considered in connection with the accompanying drawings wherein.

DETAILED DESCRIPTION

Figure 1:
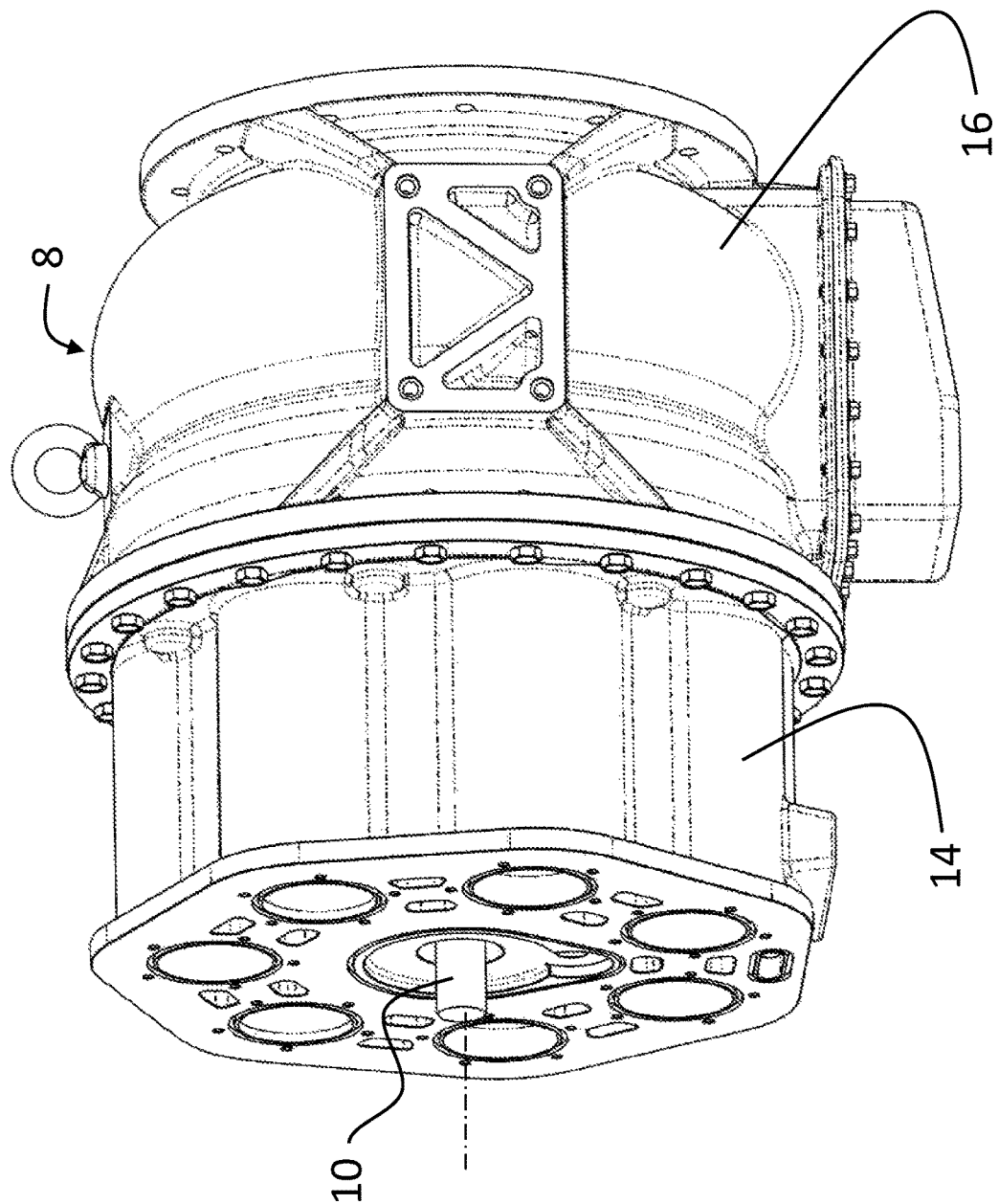
FIG. 1 is a pictorial representation of an exemplary implementation of the continuously variable displacement (CVD) engine.
Figure 2A:
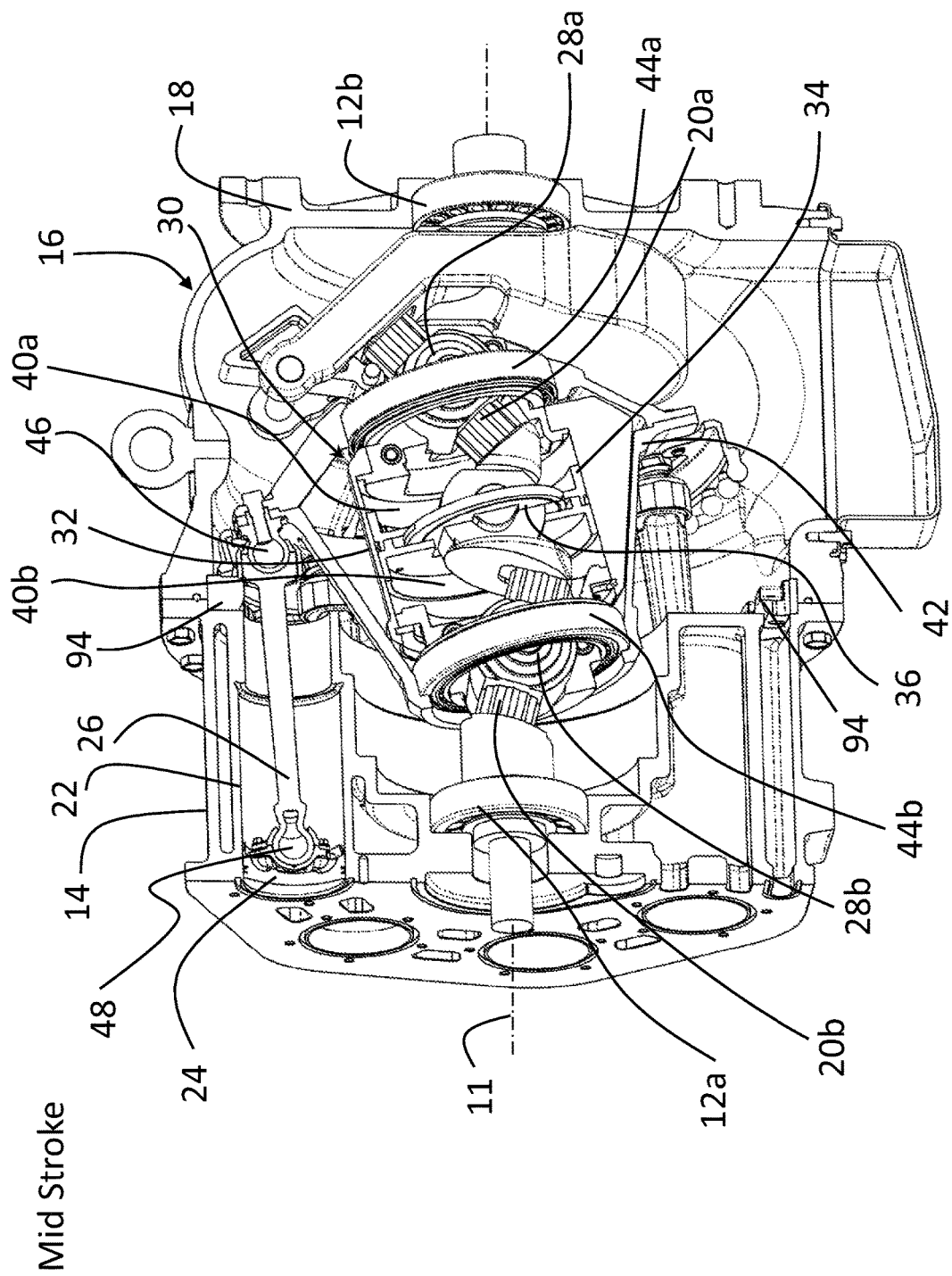
FIG. 2A is a section pictorial view of the implementation of FIG. 1.
Figure 2B:
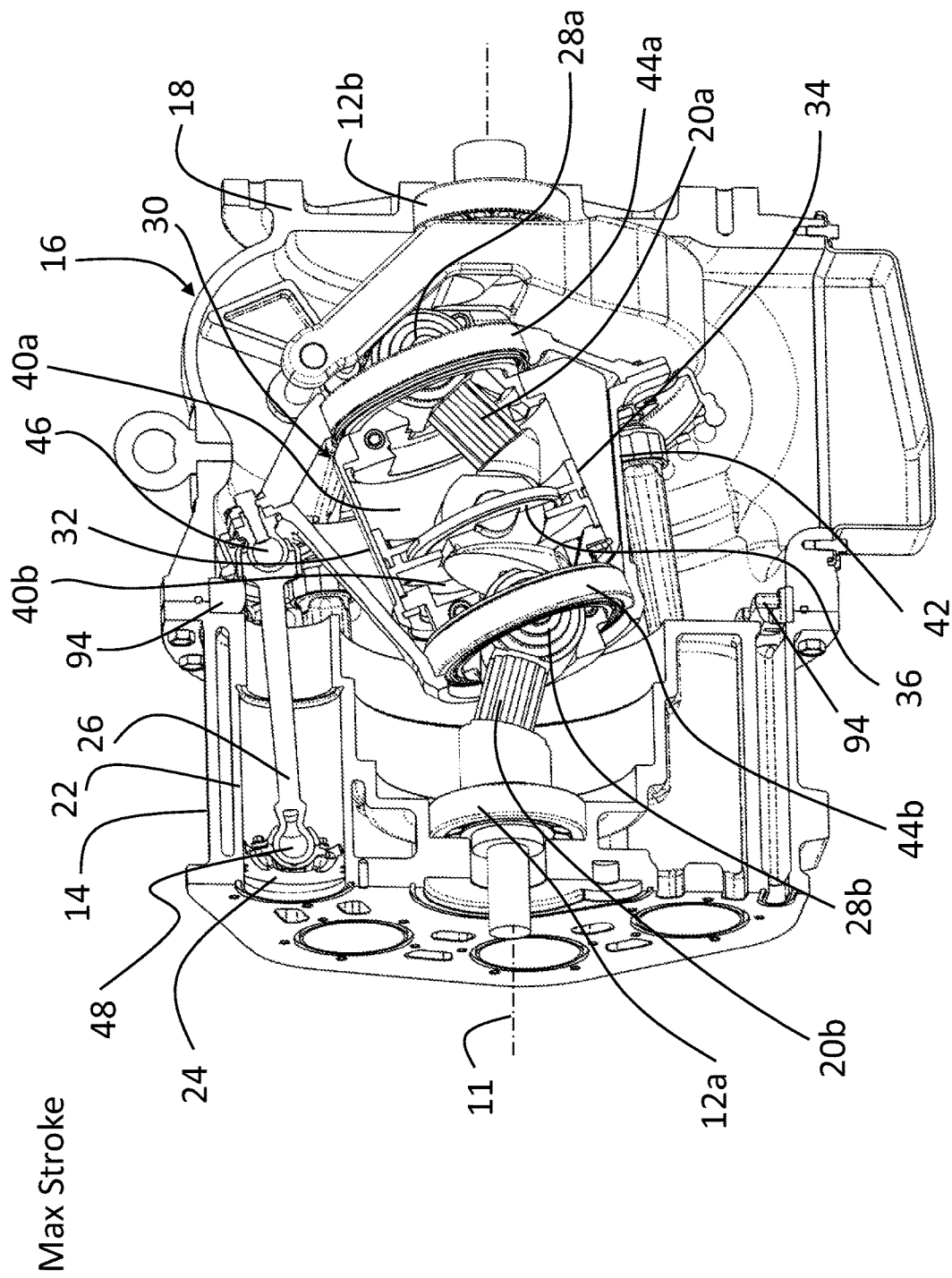
FIG. 2B is a side section view of the implementation as shown in FIG. 2A at the maximum stroke position.
Figure 2C:
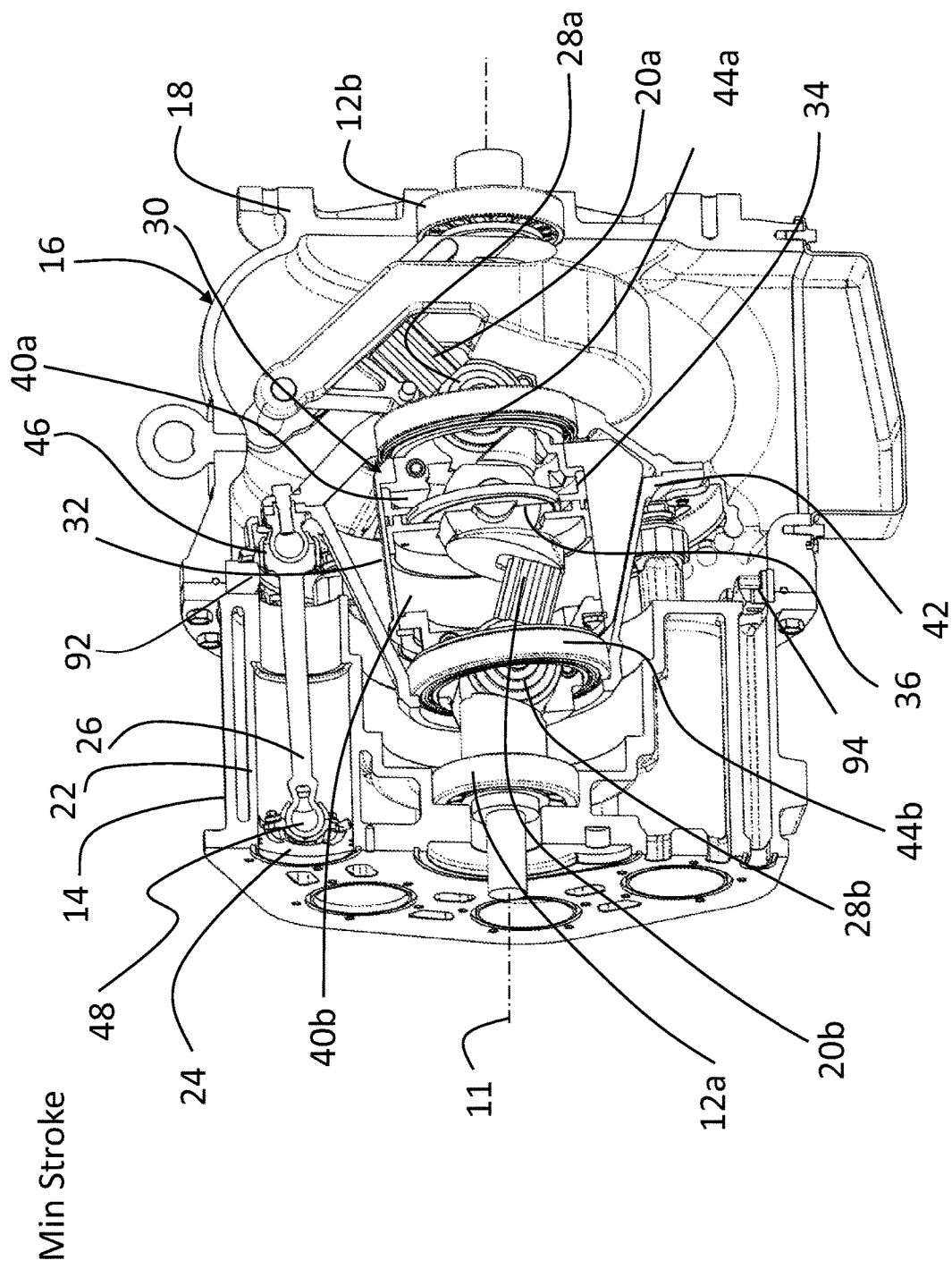
FIG. 2C is a side section view of the implementation as shown in FIG. 2A at the minimum stroke position.
Figure 3:
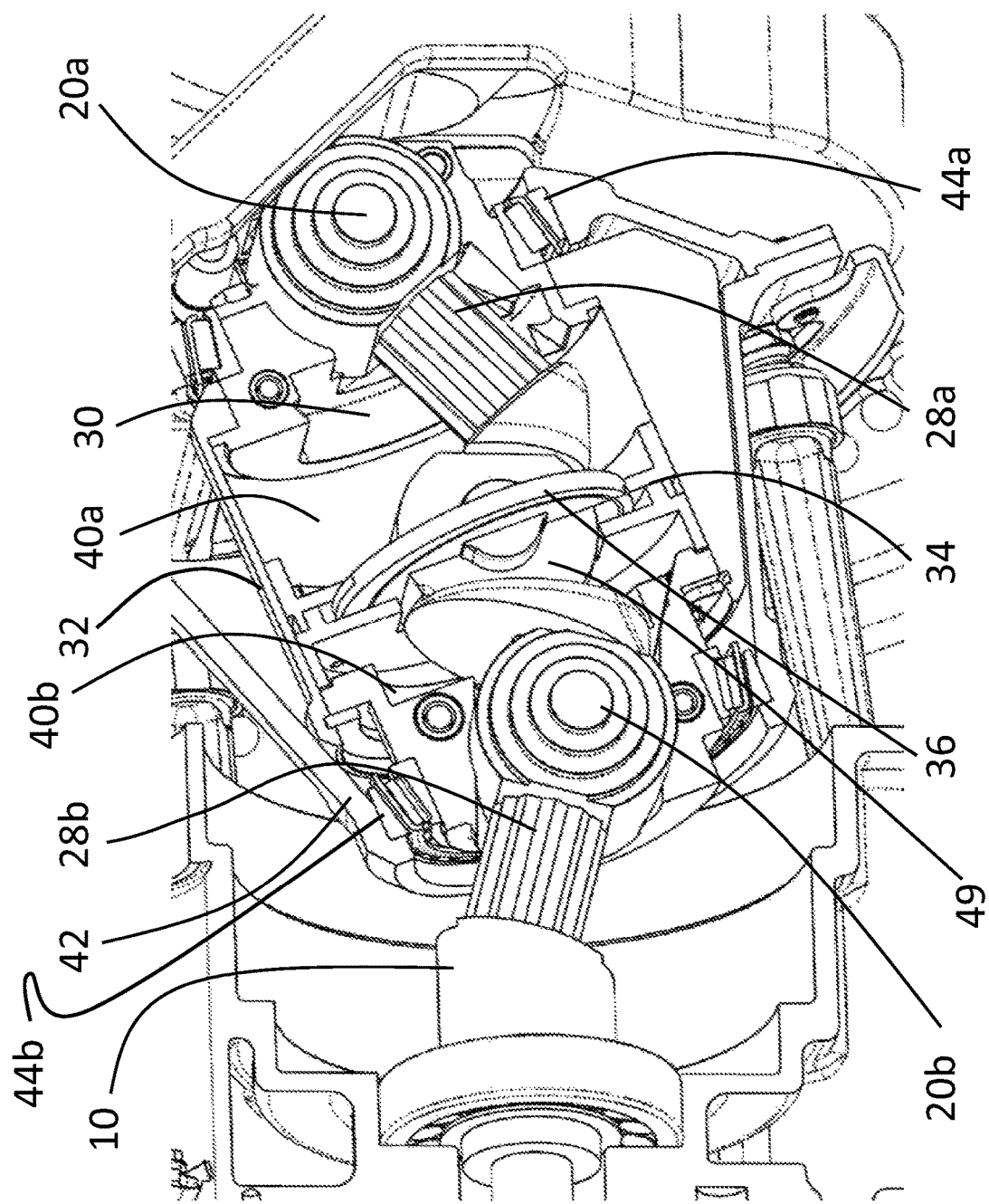
FIG. 3 is a detailed view showing the carrier assembly and nutator.
Figure 13:
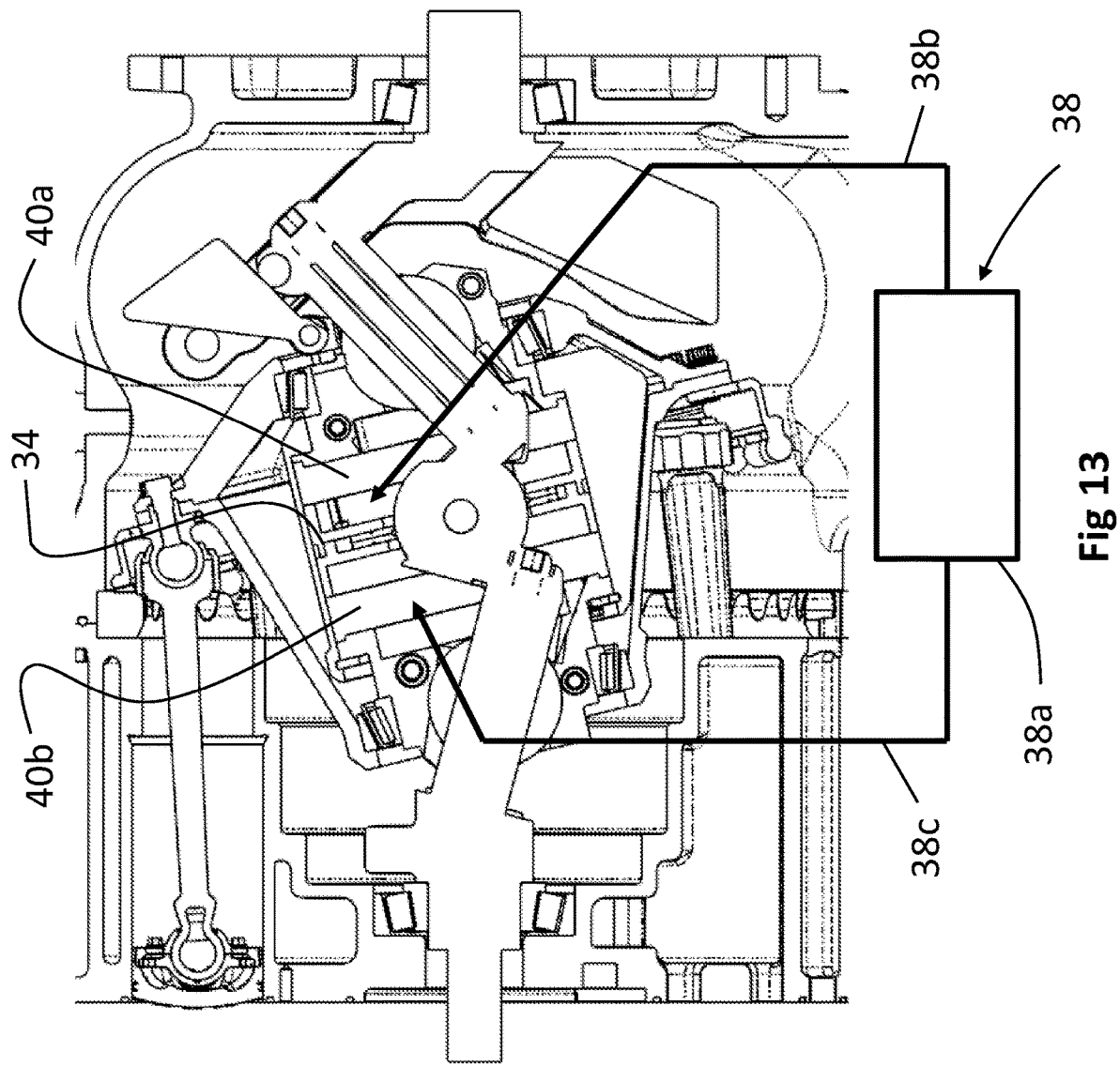

An exemplary implementation of a variable stroke constant compression ratio engine disclosed herein is shown generally in FIGS. 1, 2 and 3. The engine 8 incorporates a cylinder block 14 and a crankcase 16. As seen in FIGS. 2 and 3, a crankshaft 10 rotates in two bearings 12a, 12b, in cylinder block 14 and engine bedplate 18 on the crankcase respectively, and has a lower journal 20a and an upper journal 20b. The rotation centerline for the crank is substantially parallel to the cylinders 22 and direction of motion for the pistons 24 which are carried by connecting rods 26. For the exemplary implementation a 7 cylinder engine is employed. However, the disclosures herein are equally applicable to an engine with 3, 5, or 9 cylinders or other configurations. Choosing an odd number of cylinders allows the engine to be even firing when designed as a 4 cycle engine having a repeating cycle of 720 degrees of rotation. Each journal 20a, 20b has a slider ball 28a, 28b mounted for sliding motion along the journal. The slider balls 28a, 28b are captured in a carrier assembly 30. The carrier assembly 30 includes an actuating cylinder 32 which carries an actuation piston assembly 34 that receives a pivot plate assembly 36 connected intermediate the upper and lower journals 20a, 20b. The carrier assembly 30 including the actuating cylinder 32, and slider balls 28a, 28b all rotate as a control assembly with the crankshaft 10. The carrier assembly 30 slides on the journals and is responsive to control by a hydraulic circuit 38 (shown schematically in FIG. 13) having a controller 38a and hydraulic conduits 38b, 38c. Lower and upper cavities 40a and 40b are created in actuating cylinder 32 by piston assembly 34 and pivot plate assembly 36 which is integrally connected to the crankshaft 10 thereby providing a double acting hydraulic circuit. However, the disclosures herein are equally applicable to a single acting hydraulic circuit. To lengthen the stroke of the pistons 24 oil is admitted under pressure into cavity 40b and relieved from cavity 40a which pushes the carrier assembly 30 to higher eccentricity. To shorten the stroke, oil is admitted under pressure into cavity 40a and relieved from cavity 40b to push the carrier assembly 30 to lower eccentricity. Variation of the stroke and adjustment of the compression ratio are simultaneously accomplished by motion of the cradle on the crankshaft with the slider balls 28a, 28b on the upper and lower journals 20a, 20b. The dual angle journals on the crankshaft effectively allow a substantially fixed air/fuel ratio by controlling the volume rather than the pressure in the engine cylinders 22. FIG. 2B shows the carrier assembly at the at the maximum stroke position while FIG. 2C shows the carrier assembly at the minimum stroke position.

A nutator 42 is connected to the carrier assembly 30 using bearings 44a, 44b and is connected to the engine crankcase or cylinder block through an anti-rotation mechanism to be described in greater detail subsequently. The bedplate and crankcase for the engine disclosed in the embodiments herein is solely for exemplary purposes. The actual shape and configuration of the bedplate may be altered as required to accommodate engine mounting and other interface applications. The rotation of the carrier assembly 30 and associated control elements and the constraining anti-rotation feature cause the nutator 42 to create a sinusoidal motion at each of its connections to connecting rods 26. The connecting rods 26 are connected to the nutator 42 through ball and socket big end rod bearings 46 to accommodate the required degrees of freedom for motion of the nutator. In alternative exemplary embodiments hydrodynamic bearings or rolling element anti-friction bearings may be employed.

Connecting rods 26 are driven by pistons 24 and connected by the little end bearings 48 which are also ball and socket bearings. For the implementation shown, the structure of the engine employs the crankcase 16 and the bedplate 18, and the cylinder block 14. Those skilled in the art will note that the engine could be configured with integral cylinder bores or with wet or dry liners and the shape and attachments of the crankcase and cylinder block may be modified for various applications of the engine.

For the embodiment shown, the crankshaft 10 extends through the engine cylinder block 14 and bedplate 16 carried in bearings 12a and 12b respectively and a gear may be mounted to drive an inlet and exhaust valve train (not shown) for combustion air and exhaust communication with the cylinders. Conventional IC engine practice can be used to design the cylinder heads and valve train in a multitude of configurations. In alternative embodiments, a helical gear valve train driven or a pushrod valve-train driven by an axial cam or electronic valve actuation may be employed.

Actuation Piston and Reacting Joint

Figure 4:
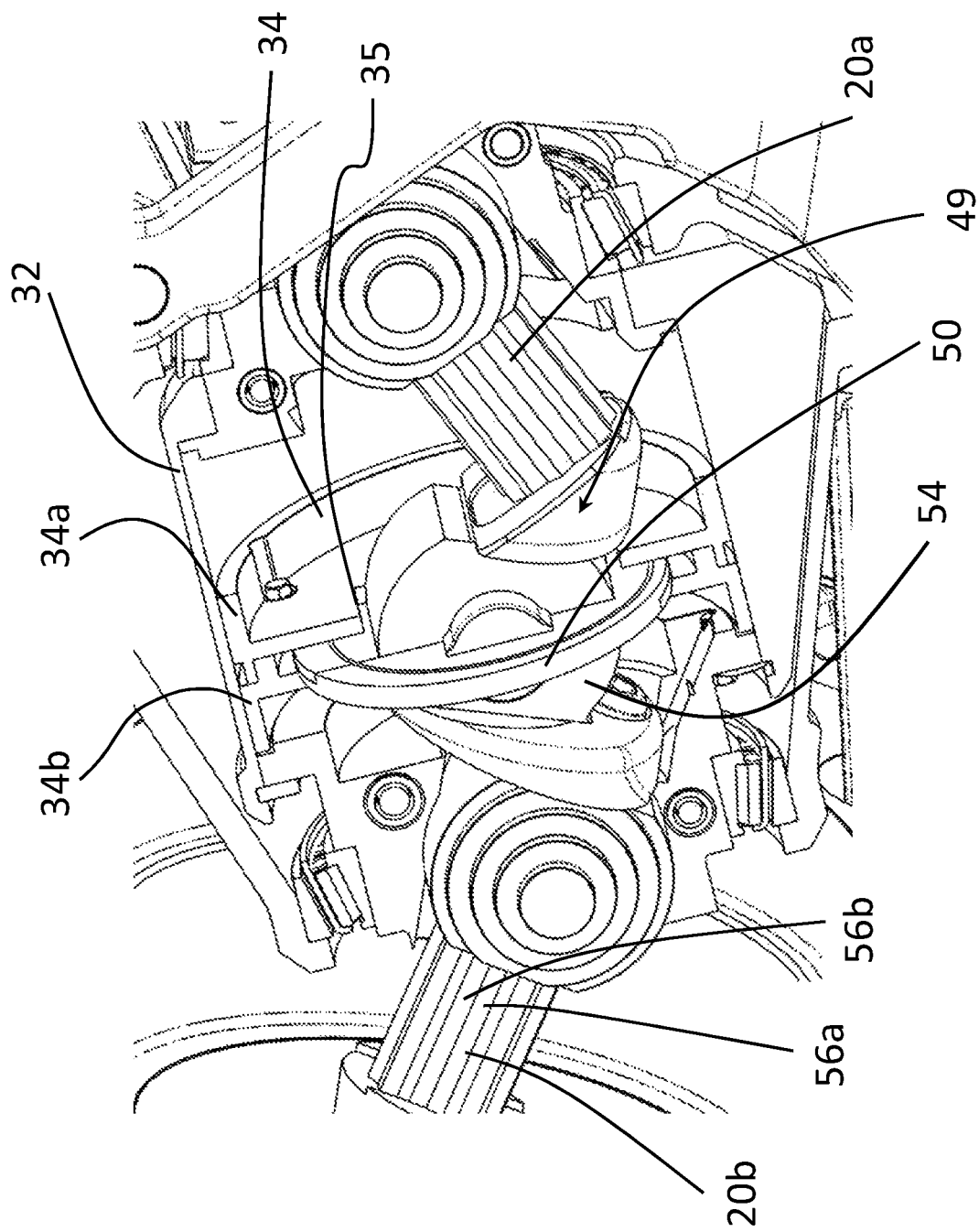
FIG. 4 is a detailed view of the actuation piston assembly and pivot plate assembly.
Figure 5:
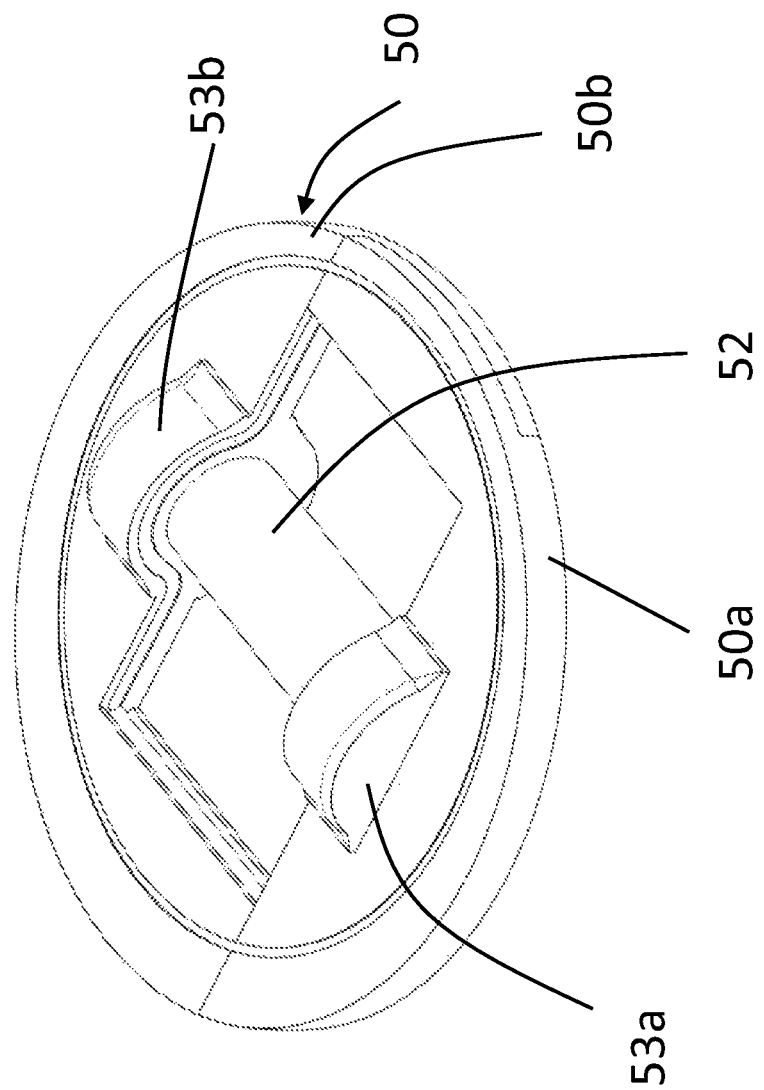
FIG. 5 is a detailed depiction of the pivot plate assembly.

Motion between the attachment to the crankshaft 10 and the actuation piston assembly 34 must be accommodated. The actuation piston assembly and associated pivot plate assembly 36 slides up and down inside the carrier assembly 30 and is a hydraulic actuator. The center of the pivot plate assembly 36 must stay on the centerline of the carrier assembly 30, but the carrier assembly moves up and down on the two slider balls, 28a and 28b, each of which is at an angle to the crankshaft centerline 11. Therefore, an attachment mechanism must account for all of the different linear and rotational motions. In addition to the motion challenge, the device must overcome all of the inertial and combustion forces to hold the position and transfer that load to the crankshaft. As seen in FIGS. 4 and 5, a reacting assembly 49 engages the pivot plate assembly 36, which has a pivot plate 50 with a large shaft 52 received in a boss 54. The reacting assembly 49 is secured to the bottom journal 20a and top journal 20b and pins the pivot plate assembly 36 and thus the actuating piston assembly 34 to the crankshaft 16. This is a robust joint and can be sized to take extreme loads. The plate 50 is made in two overlapping split halves 50a, 50b each with a shaft support end 53a, 53b.

Figure 6:
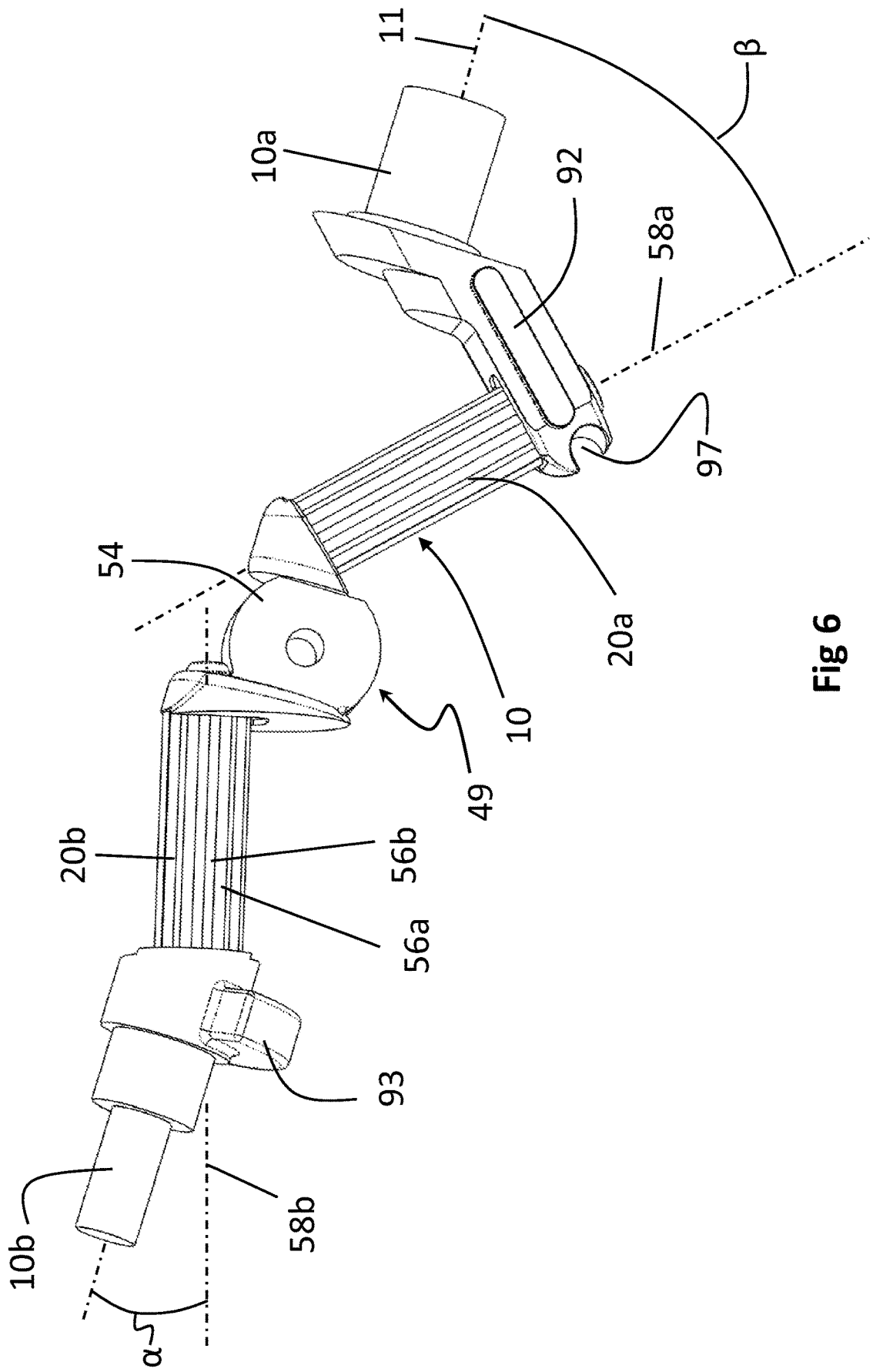
FIG. 6 is a side view of the crankshaft.

For the implementation shown in FIG. 4, the actuating piston assembly 34 also has an lower half 34a and an upper half 34b and is assembled with bolts and spacers to secure the pivot plate 50. The lower half and upper half each have a cutout 35 to receive the reacting assembly boss 54. The journals 20a, 20b on crankshaft 16 as shown in FIGS. 4 and 6 have splines 56a and channels 56b, parallel with the journal axes 58a, 58b, which are received in mating splines and channels in the slider balls 28a, 28b to further facilitate motion control. The crankshaft 10 has a lower termination 10a angularly engaging lower journal 20a and an upper termination 10b engaging upper journal 20b. For the embodiment shown, the attachment may employ bolts inserted on the axes 58a, 58b of the journals.

The lower journal axis 58a has a first angle α relative to the rotational axis 11 of the crankshaft while the upper journal axis 58b has a second angle β relative to the rotational axis 11. Lower journal 20a and upper journal 20b on the crankshaft 10 function separately based on the associated angles α and β with the upper journal adjusting the position of the piston at Top Dead Center (TDC) and the lower journal adjusting the position of the piston at Bottom Dead Center (BDC). The maximum displacement is a function of the lower journal angle β (angle to the centerline of the crankshaft). The relationship of compression ratio (CR) to the displacement is a function of the upper journal angle α. While this angle can be chosen to maintain a substantially fixed CR, it also can be chosen to optimize the CR as a function of engine load. Tailoring of the compression ratio of the engine to the combustion system for an optimized solution is therefore possible with selection of α and β.

Carrier

Figure 7:
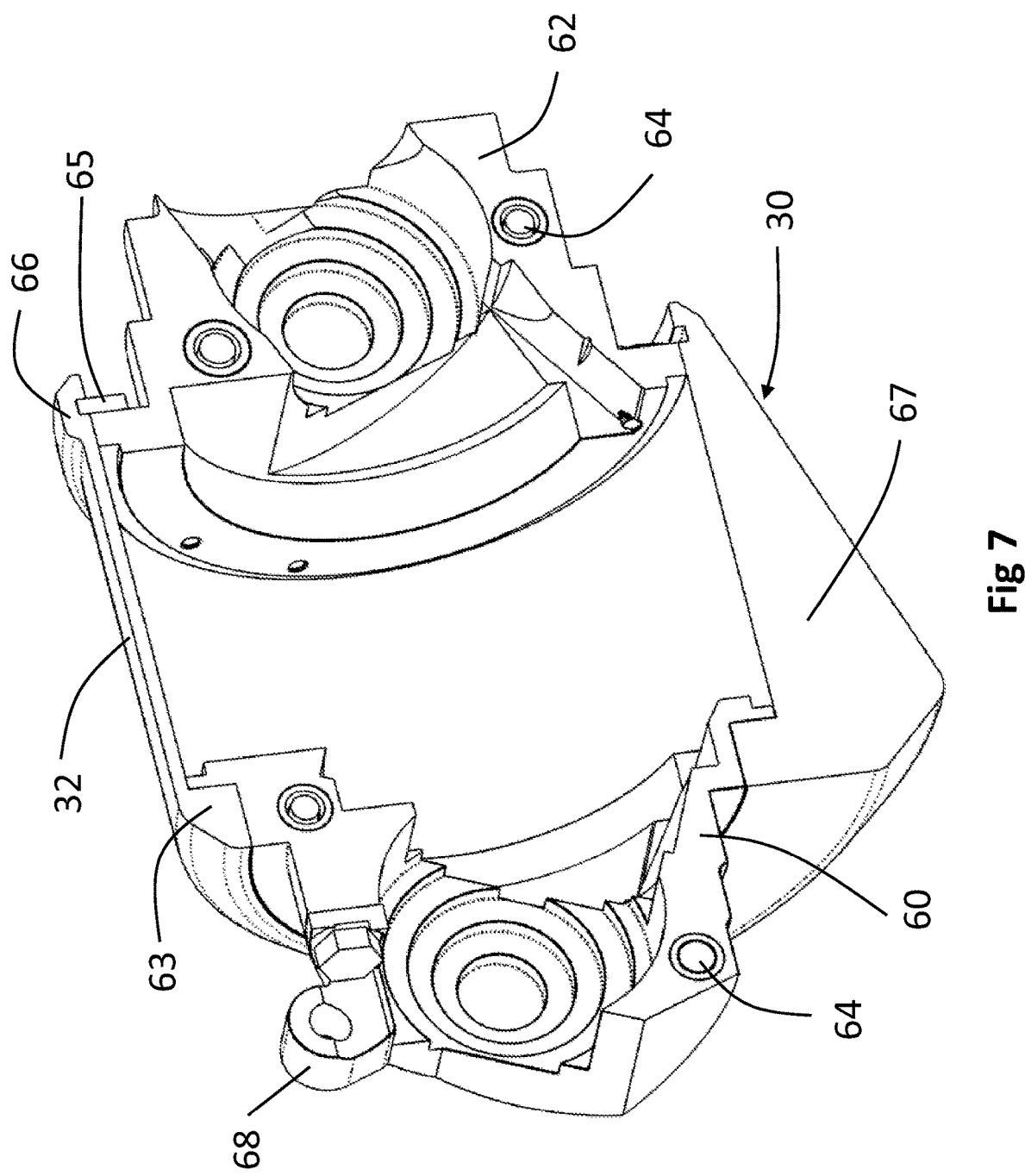
FIG. 7 is a sectioned pictorial depiction of the carrier assembly.

The carrier assembly 30 is shown in detail in FIG. 7. The internal features of the carrier assembly 30 must be machined, which is difficult without dividing the part into left and right halves or by making the part by 3D printing. A split lower clevis 60 engages the lower slider ball 28a and a split upper clevis 62 engages the upper slider ball 28b. The halves of each clevis are bolted together with locating dowels 64 to assure perfect alignment. The outside machining may be done with the halves bolted together.

The actuating cylinder 32 is a hydraulic cylinder. It is not practical to split a hydraulic cylinder into longitudinal halves. The carrier assembly 30 is divided into the center hydraulic actuating cylinder 32 and two ends composed of the lower and upper clevis 60, 62. Each clevis and assembled over the respective slider ball and the actuating cylinder 32 may then be concentrically installed over the clevises. For the exemplary implementation, the cylinder 32 employs a capture flange 63 to engage the lower clevis 60 and the upper clevis 62 is engaged with a snap ring 65 received in a snap ring groove 66 in the upper terminal end of the cylinder. This allows the diameter of the hydraulic cylinder to be increased, which is desirable to lower the hydraulic pressure requirements for controlling the variable stroke mechanism.

For the exemplary implementation, the actuating cylinder 32 is externally machined with an integral carrier balance weight 67.

The lower clevis 60 incorporates an attachment boss 68 to connect an articulated balance mechanism to the carrier assembly 30. The balance weight is articulated to change the eccentricity and axial location of the unbalance, in concert with the unbalance requirements.

Nutator (Wobbler)

Figure 8:
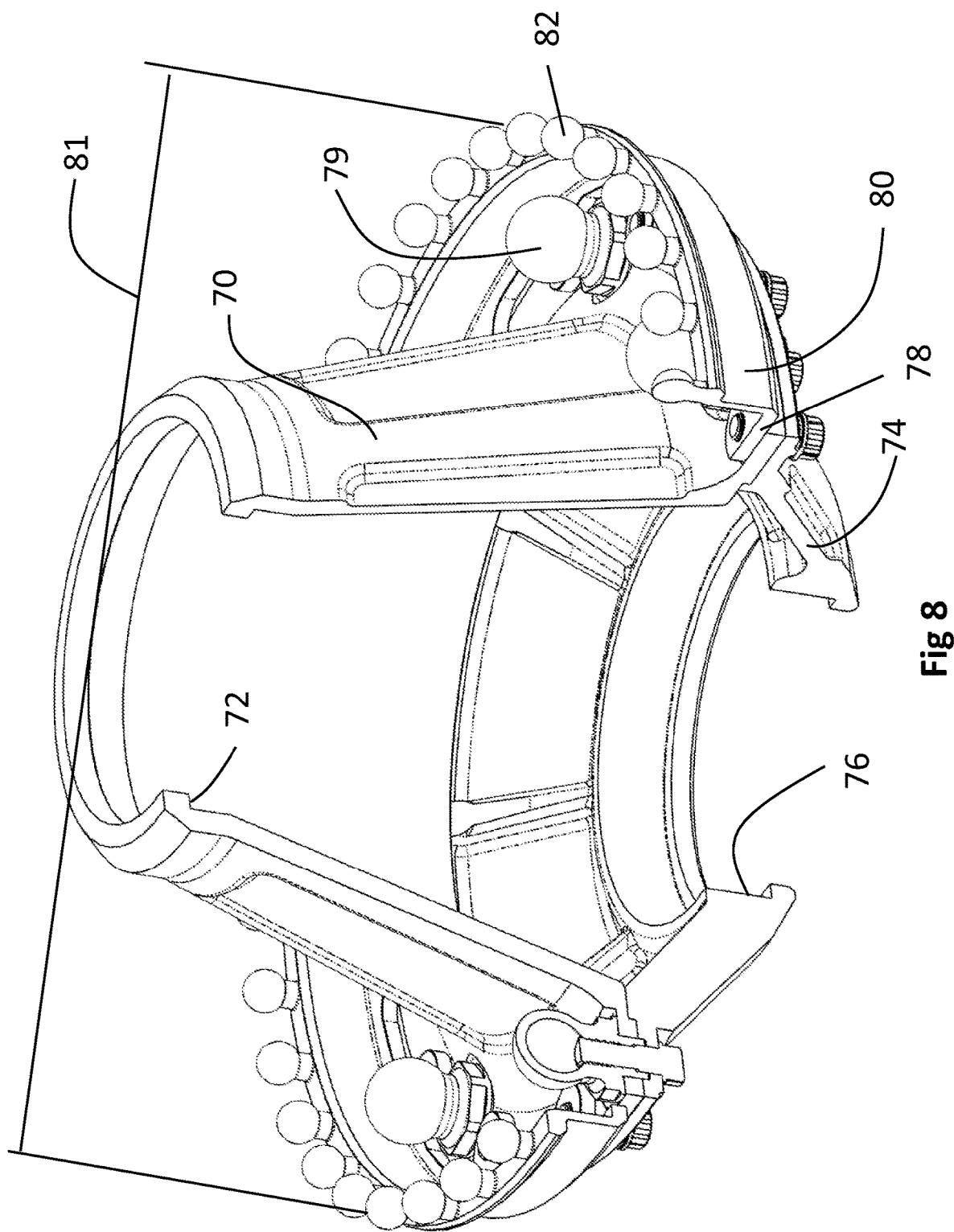
FIG. 8 is a partial section pictorial depiction of the nutator.

The nutator 42 represents the largest rotating mass and requires the largest counterbalance mass. As the counterbalance mass is on the "other side" of the nutator bearings 44b, the mass loads the nutator bearings, increasing the friction and adversely affecting the bearings. A multi-piece design is employed as shown in FIG. 8 for the nutator to be assembled concentrically over the carrier assembly 30. A frusto-conical upper shell 70 is axially received over an upper bearing 44b, engaged on the carrier assembly 30 at the upper split clevis 62, which is engaged in an upper race containment flange 72. Similarly, a frusto-conical lower shell 74 is axially received over a lower bearing 44a, carried by the lower split clevis 60, which is engaged in a lower race containment flange 76. The nutator 42 has a radially extending skirt 78 at the interface between the upper shell 70 and lower shell 74 in the exemplary implementation. The balls 79 of the ball and socket big end rod bearings 46 for connection to the cylinder rods 26 extend from skirt 78. The balls 79 may be fabricated from hardened steel with DLC coating while the shell structure of the wobbler may be aluminum castings, thus reducing the mass and inertia of the part. The skirt 78 incorporates an end flange 80 on which gear balls 82 are mounted as an element of the anti-rotation mechanism to be described subsequently. The upper and lower shells may be clamped by the attached bolts for the rod balls and/or gear balls the shell is piloted for stability and rigidity under axial loading.

Balancer Design

Figure 9:
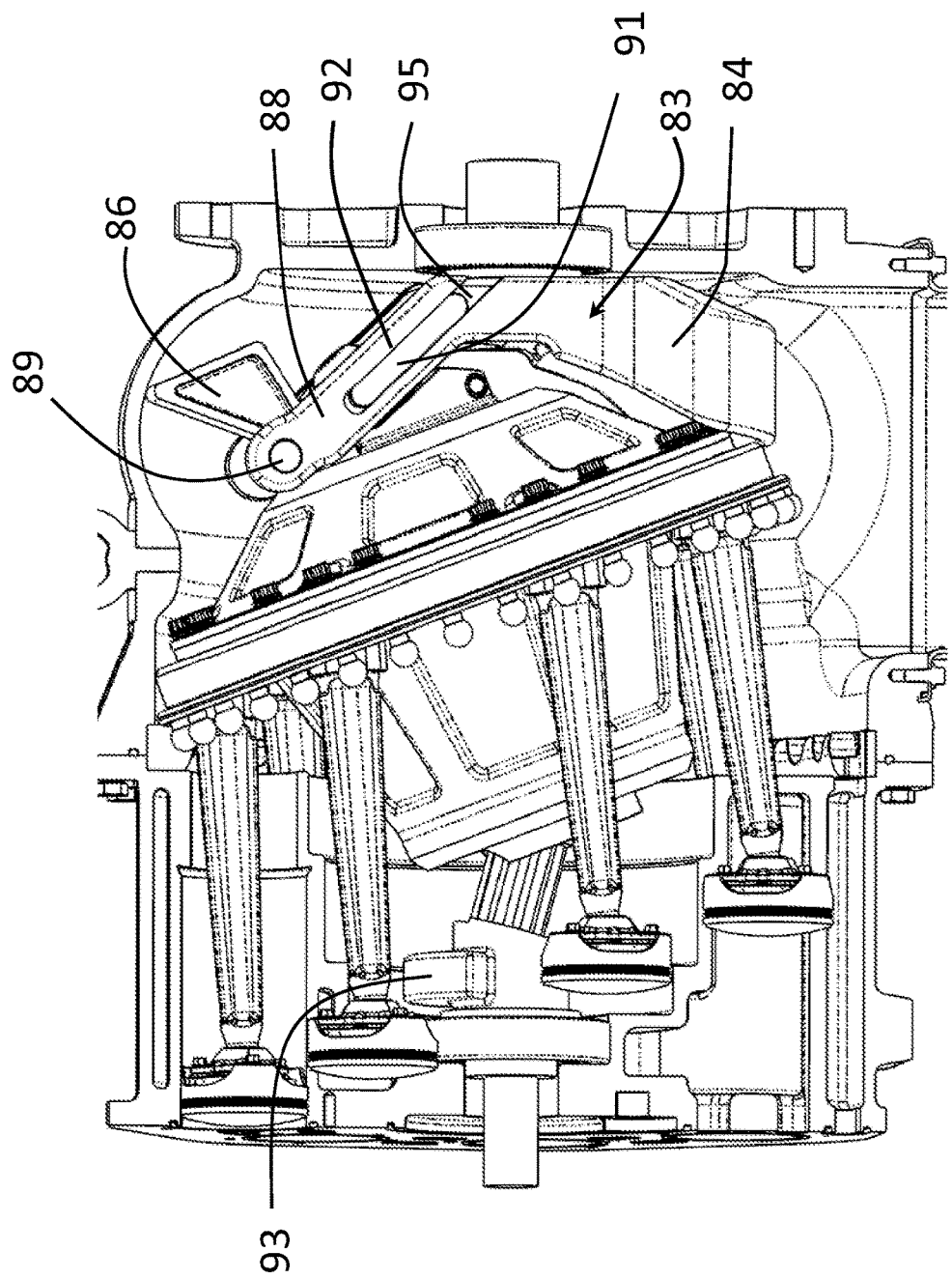
FIG. 9 is a side section of the implementation showing the balancer.
Figure 10:
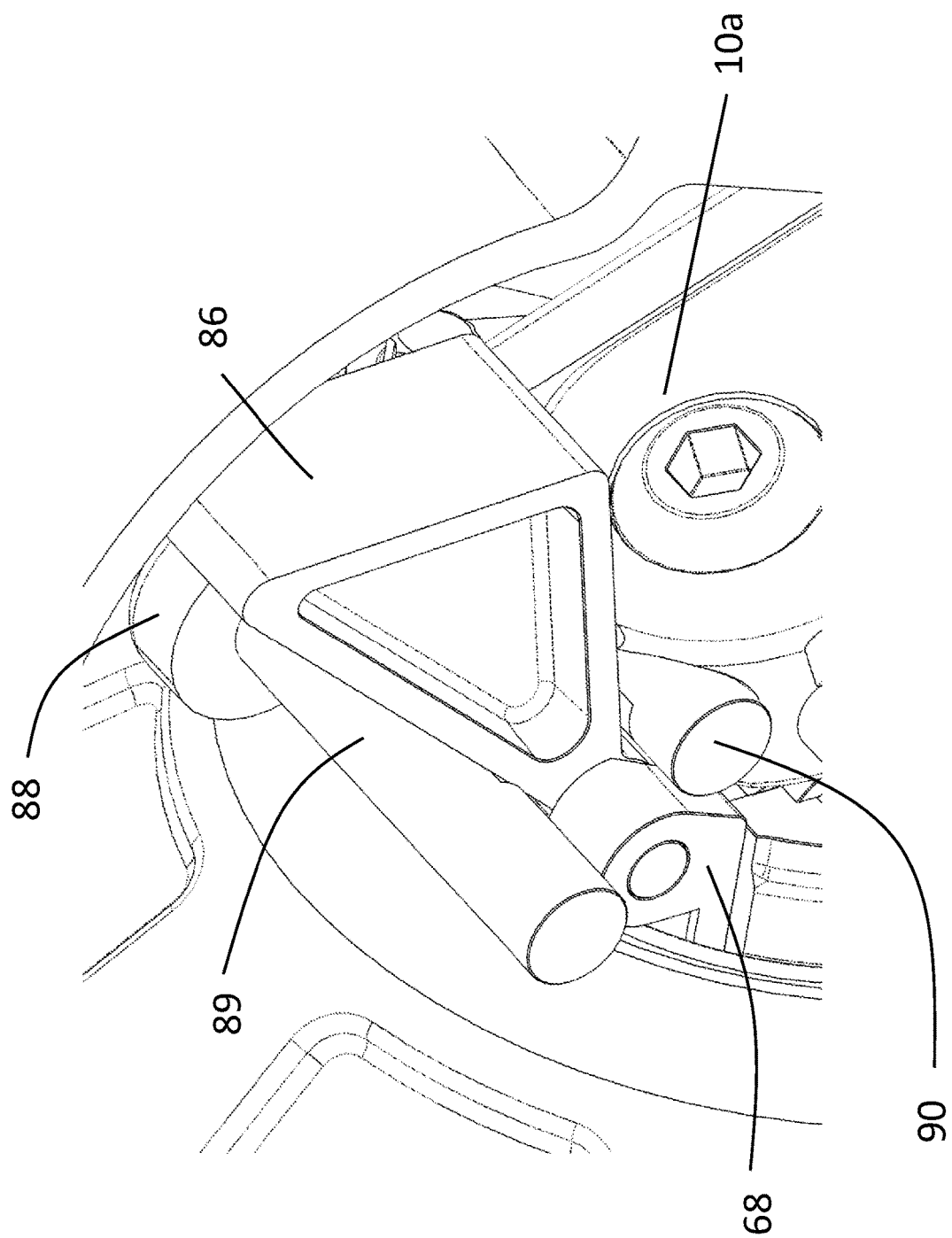
FIG. 10 is a detailed view of the weight position control wedge.

Not only does the eccentricity of the nutator 42 reduce with stroke, but the axial position of the residual unbalance changes with stroke. A balance mechanism 83 is provided which not only changes the amount of counterbalance for the nutator 42 but changes the axial location of the counterbalance consistent with the eccentricity of the nutator. A "cam-based" design is incorporated in the exemplary implementation. A balance weight 84, having extending support arms 88 positioned on opposite sides of the crankshaft 10, is subject to a centripetal force urging the weight radially outward. A wedge 86 effectively placed between the support arms 88 and the crankshaft 10 is used as a cam to position the weight as the carrier assembly 30 and nutator 42 change position. The wedge 86 is attached to the carrier assembly 30 at attachment boss 68 and is pinched between a balance weight stop roller 89 rotatably engaged in a terminal end of the support arms 88 and a loading roller 90 rotatably engaged in receiver 97 (seen in FIG. 6) at the angular extent of the lower termination 10a of the crankshaft as shown in FIGS. 9 and 10. The geometry of the wedge 86 can be changed to adjust the reduction in eccentricity of the balance weight 86 to precisely match the changing unbalance requirements of the mechanism.

The stop roller 89 and the loading roller 90, one providing the stop mechanism for the balance weight and the other providing the loading interface with the crankshaft, are circular to be rotatable in their supports but both have flats on the round surface for contact with the wedge 86. The round shape allows the rollers 89, 90 to rotate slightly as the stroke changes. The flat surface lowers the contact stress with the wedge.

The weight 84 is supported by and shifts position with a linear bearing 92 (also seen in FIG. 6) on the lower termination 10a of the crankshaft 10 with the shifted position shown in FIGS. 2B and 2C at the maxima and minima. The linear bearing 92 consists of two linear bosses 91, one extending from each side of the crankshaft 10 perpendicular to a plane of eccentricity of the crankshaft, received in mating slots 95 on the support arms 88. The angle of the support arms 88 determines the relationship between the eccentricity changing and the axial shift of the unbalance weight.

A fixed counter balance weight 93 extending from the crankshaft 10 (seen in FIG. 6) extending from the upper termination 10b in the exemplary implementation) may also be employed.

The carrier balance weight 67, shown in FIG. 7, may be integral with the carrier or may be attached thereto and provides an additional balance feature. The carrier assembly 30 is a rotating part, not nutating, so an eccentric weight added to it functions very nearly the same as the movable lower balance weight. Incorporation of the balance weight 67 inside the nutator 42 in a dead space area moves to reduce eccentricity as the stroke is reduced but without the need of a linkage. In certain implementations, the carrier balance weight 67 can be optimized to provide 100% of the balance required, and the moving lower balance weight may be eliminated.

Anti-Rotation System

Figure 11:
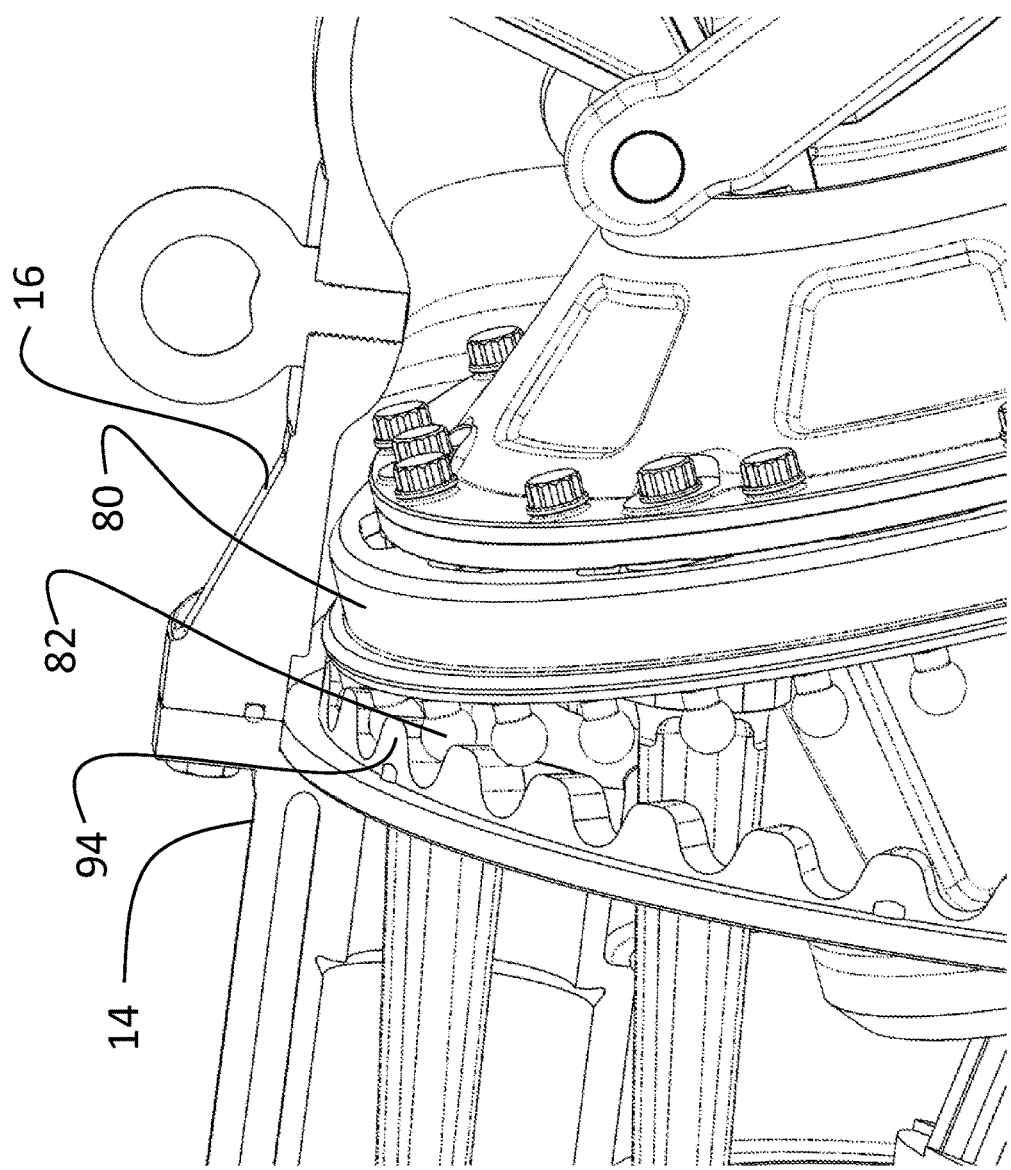
FIG. 11 is a first detailed view of the anti-rotation mechanism at maximum stroke position.
Figure 12:
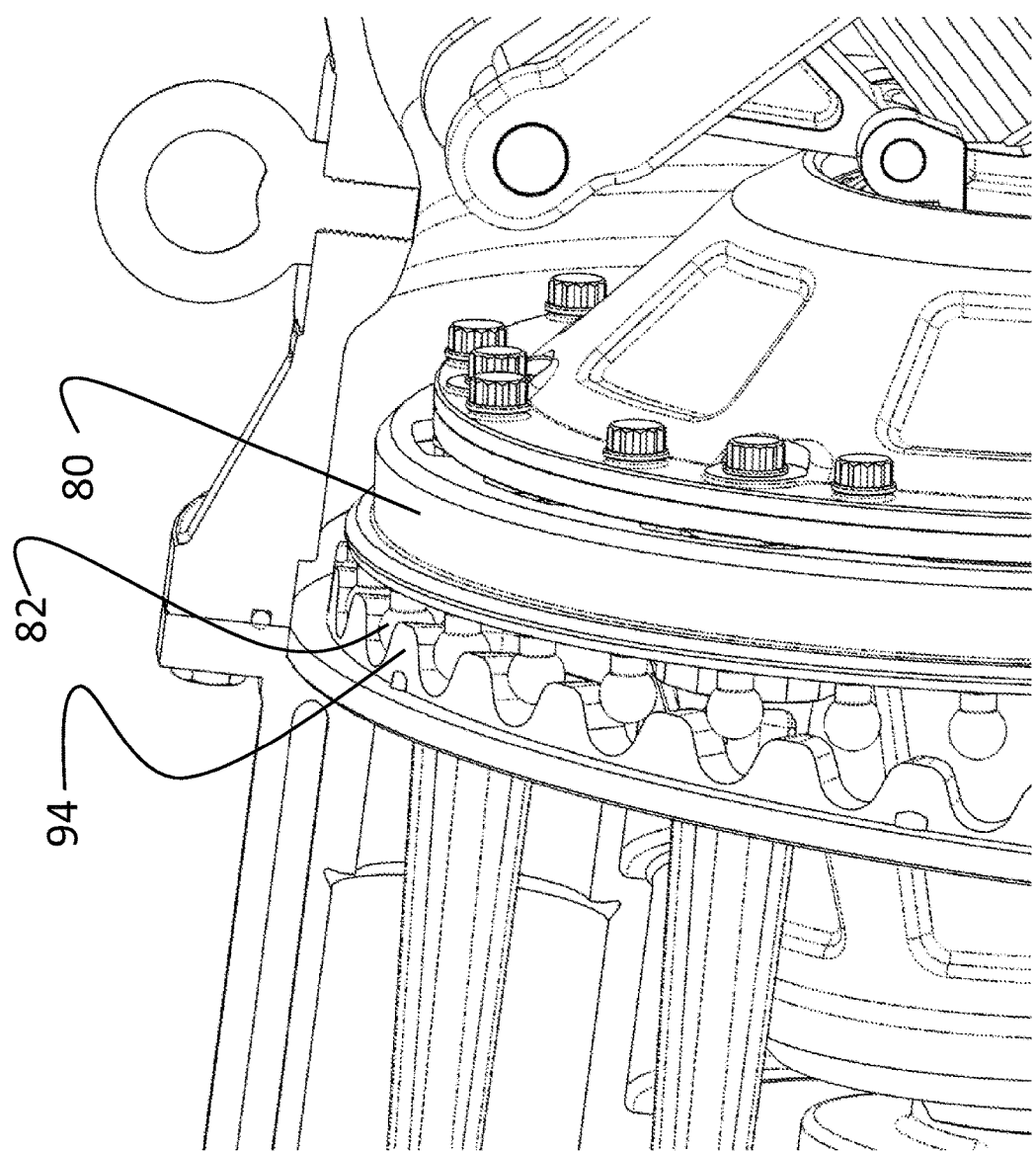
FIG. 12 is a second detailed view of the antirotation mechanism at minimum stroke position; and, FIG. 13 is a schematic representation of the hydraulic system.

An anti-rotation system employs a stationary gear 94, mounted on a recess at the interface between the cylinder block 14 and crankcase 17, engaging the gear balls 82 extending from the edge flange 80 of the nutator skirt 78, as shown in FIGS. 11 (max stroke) and 12 (min stroke). The upper and lower frusto-conical shells 70, 74 terminate in the radially extending skirt 78 at a diameter 81 determined to place the gear balls in the proper orbital path to engage the stationary gear 94 throughout the range of eccentric operation provide an optimum structure for both reduced weight and desired rigidity. The exemplary implementation employs 35 gear balls 82. The choice of 35 engaging elements was based on being a multiple of the number of cylinders (7) and spacing such that a gear ball 82 did not line up with a rod 26 and ball 79 of the associated ball and socket big end rod bearing 46. This places the rods nestled between two gear balls and the material thickness of the rod will not interfere with the stationary gear 94.

The gear 94 and gear balls 82 (which are spherical in the implementation shown) provide a substantially point contact approximating a pure rolling relative motion. An involute shape which has pure rolling relative motion is desirable.

The implementations disclosed herein are exemplary only and modifications and substitutions may be made which fall within the scope of the invention as defined in the following claims.

What is claimed is:

1. A continuously variable displacement engine comprising:
    a plurality of pistons received in a cylinder block and connected to a nutator;
    a crankshaft carried in a crankcase and having an axis of rotation and
        an upper journal with a first angle relative to the axis and
        a lower journal with a second angle with respect to the axis;
    a first slider ball engaged on the upper journal and a second slider ball engaged on the lower journal;
    a carrier assembly capturing the first and second slider balls and incorporating an actuating cylinder;
    an actuation piston assembly translatably carried in the actuating cylinder and connected to the crankshaft intermediate the upper journal and lower journal, said actuating piston controllably translating between a first high eccentricity position and second low eccentricity position;

an anti-rotational assembly connecting the nutator to a piston case; and, a balance mechanism adapted to axially and radially change the amount of counterbalance for the nutator and the axial location of the counterbalance consistent with eccentricity of the nutator, the balance mechanism comprising a balance weight having extending arms positioned on opposite sides of the crankshaft and a wedge placed between the arms and the crankshaft, said wedge effective as a cam to position the weight axially and radially as the carrier assembly and nutator change postion.

2. The continuously variable displacement engine as defined in claim 1 wherein the carrier assembly comprises:

a split lower clevis engaging the second slider ball and a split upper clevis engaging the first slider ball, said split lower clevis received in a lower termination of the actuating cylinder and the split upper clevis received in an upper termination of the actuating cylinder.

3. The continuously variable displacement engine as defined in claim 2 wherein lower and upper cavities are created in the actuating cylinder by the actuation piston assembly and a pivot plate assembly engaged in the actuation piston assembly is integrally connected to the crankshaft thereby providing a double acting hydraulic circuit.

4. The continuously variable displacement engine as defined in claim 3 wherein a reacting assembly engages the pivot plate assembly which has a pivot plate having a shaft received in a boss of the reacting assembly, the reacting assembly secured to the bottom journal and top journal thereby pinning the pivot plate assembly to the crankshaft.

5. The continuously variable displacement engine as defined in claim 4 wherein the pivot plate comprises two overlapping split halves each with a shaft support end receiving the shaft.

6. The continuously variable displacement engine as defined in claim 5 wherein the actuation piston assembly further comprises an upper half and a lower half, said upper and lower half secured to engage the pivot plate and each of the upper and lower half having a cutout to receive the boss of the reacting assembly.

7. The continuously variable displacement engine as defined in claim 1 wherein the wedge is attached to the carrier assembly at an attachment boss.

8. The continuously variable displacement engine as defined in claim 7 wherein the wedge is pinched between a balance weight stop roller rotatably engaged in a terminal end of the weight arms and a loading roller rotatably engaged in a receiver on the lower termination of the crankshaft.

9. The continuously variable displacement engine as defined in claim 8 wherein the weight is supported by and shifts position with a linear bearing on the lower termination of the crankshaft, said linear bearing comprising a linear boss extending from each side of the crankshaft perpendicular to a plane of eccentricity of the crankshaft and mating slots on a support arm receiving each linear boss.

10. The continuously variable displacement engine as defined in claim 1 further comprising a fixed counter balance weight extending from the crankshaft.

11. A continuously variable displacement engine comprising:

a plurality of pistons received in a cylinder block and connected to a nutator;

a crankshaft carried in a crankcase and having an axis of rotation and an upper journal with a first angle relative to the axis and a lower journal with a second angle with respect to the axis;

a first slider ball engaged on the timer journal and a second slider ball engaged on the lower journal;

a carrier assembly capturing the first and second slider balls and incorporating an actuating cylinder;

an actuation piston assembly translatably carried in the actuating cylinder and connected to the crankshaft intermediate the upper journal and lower journal, said actuating piston controllably translating between a first high eccentricity position and second low eccentricity position;

an anti-rotational assembly connecting the nutator to a piston case;

a balance mechanism adapted to axially and radially change the amount of counterbalance for the nutator and the axial location of the counterbalance consistent with eccentricity of the nutator; and an eccentric carrier balance weight integral with the carrier or attached thereto.

12. The continuously variable displacement engine as defined in claim 11 wherein the eccentric carrier balance weight is integral with the actuating cylinder.

13. The continuously variable displacement engine as defined in claim 11 wherein the nutator comprises:

a frusto-conical upper shell axially received over an upper bearing on the carrier assembly and engaged in an upper race containment flange;

a frusto-conical lower shell axially received over a lower bearing on the carrier assembly and engaged in a lower race containment flange; and, a skirt radially extending from an interface of the frusto-conical upper shell and frusto-conical lower shell, said skirt supporting rod bearings connected to cylinder rods extending from the pistons.

14. The continuously variable displacement engine as defined in claim 13 wherein the upper bearing is carried on the upper split clevis and the lower bearing is carried on the lower split clevis.

15. The continuously variable displacement engine as defined in claim 13 wherein the anti-rotation assembly comprises:

a stationary gear connected proximate an interface of the cylinder block and crankcase; and, a plurality of gear balls mounted to a flange extending from the skirt, said gear balls engaging the stationary gear.

16. The continuously variable displacement engine as defined in claim 15 wherein the plurality of gear balls are spherical.

17. The continuously variable displacement engine as defined in claim 15 wherein the gear balls are not aligned with the rod bearings.

* * * * *